United States Patent [19]

Pingelton

[11] Patent Number: 4,828,119
[45] Date of Patent: May 9, 1989

[54] SELF-LEVELING TRAY OR ICE DISPENSER

[75] Inventor: John R. Pingelton, Broken Arrow, Okla.

[73] Assignee: Jero Manufacturing, Inc., Tulsa, Okla.

[21] Appl. No.: 182,361

[22] Filed: Apr. 18, 1988

[51] Int. Cl.$^4$ .............................................. A47F 7/00
[52] U.S. Cl. ...................................... 211/59.3; 312/71
[58] Field of Search ................... 211/59.3, 59.2, 49.1, 211/41; 312/71, 42

[56] References Cited

U.S. PATENT DOCUMENTS

| | | | |
|---|---|---|---|
| 2,448,171 | 8/1948 | Campbell | 211/59.3 X |
| 2,468,115 | 4/1949 | Saul, Jr. | 220/93 |
| 2,717,085 | 9/1955 | Waddington | 211/74 |
| 2,816,808 | 12/1957 | Haines | 211/59.3 X |
| 3,168,198 | 2/1965 | Shelley | 211/49.1 |
| 3,407,015 | 10/1968 | Silberberg | 312/71 |
| 3,428,185 | 2/1969 | Vorndran | 211/49.1 |
| 3,511,548 | 5/1970 | McIlhone | 312/71 |
| 3,694,044 | 9/1972 | Cummings | 211/59.3 X |
| 3,738,722 | 6/1973 | Kooiman | 312/71 |
| 4,206,954 | 6/1980 | Koorman | 312/71 |
| 4,354,605 | 10/1982 | Brutsman | 211/49.1 |
| 4,449,760 | 5/1984 | House | 312/42 |

Primary Examiner—Alvin C. Chin-Shue
Assistant Examiner—Sarah A. Lechok Eley
Attorney, Agent, or Firm—Mark G. Kachigian

[57] ABSTRACT

A self-leveling tray or ice dispenser including a pair of opposed inner walls within a cavity, each wall having at least one post protruding inwardly into the cavity. A pair of removable shells is provided, each shell having a pair of opposed longitudinal tracks and an upper hanger near one end of the opposed tracks. At least one slot extends through each shell. A roller mechanism engages the opposed tracks on each shell. A pair of shelves is provided, one shelf extending into the cavity from each roller mechanism, the shelves being adapted to support ice or trays. Springs extend between the upper hanger and the roller mechanisms. One cover is slidably removable from each shell. The shells may be detachably connected to the inner walls by mating the post protruding from the wall with the slot. The shells may be attached and removed from the inner walls without use of tools for periodic cleaning and inspections.

10 Claims, 5 Drawing Sheets

SELF-LEVELING TRAY OR ICE DISPENSER

BACKGROUND OF THE INVENTION

1. Field of the Invention.

The present invention relates to a self-leveling tray or ice dispenser. More particularly, the present invention is directed to improvements in lifting mechanisms for a self-leveling tray or ice dispenser which may be connected and removed without the use of tools for easy cleaning.

2. Background of the Invention.

Various self-leveling tray or ice dispensers are known in the food service and grocery industries. Invariably, these devices include springs to provide an upward force against the downward weight of the ice or trays. Either compression springs or extension springs are generally employed. Compression springs often suffer a disadvantage in that maximum use of the storage space may not be made. Since the compression springs themselves would be beneath the removable bottom, a certain amount of space must be allocated to the compression spring.

The present invention utilizes extension springs to make maximum use of the storage space.

Wherever food is involved, all of the equipment which is used with handling and serving must be kept clean. Increasingly, through industry or government standards, dispensers such as involved in the present invention must be capable of being exposed for cleaning and inspection. This must be attended to on a regular basis without the use of tools.

A patentability search was conducted on the present invention and the following U.S. patents were uncovered:

| U.S. PAT. NO. | PATENTEE | ISSUE DATE |
| --- | --- | --- |
| 2,468,115 | Saul, Jr. | April 26, 1949 |
| 2,717,085 | Waddington | September 6, 1955 |
| 3,168,198 | Shelley | February 2, 1965 |
| 3,407,015 | Silberberg | October 22, 1968 |
| 3,428,185 | Vorndran | February 18, 1969 |
| 3,511,548, | McIlhone | May 12, 1970 |
| 3,738,722 | Kooiman | June 12, 1973 |
| 4,206,954 | Kooiman | June 10, 1980 |
| 4,354,605 | Brutsman | October 19, 1982 |
| 4,449,760 | House | May 22, 1984 |

Saul (U.S. Pat. No. 2,468,115), Shelley (U.S. Pat. No. 3,168,198) and Silberberg (U.S. Pat. No. 3,407,015) each disclose use of compression springs. No suggestion is made of detachable lifting mechanisms which would allow ready access for inspection and cleaning.

Accordingly, it is a principal object and purpose of the present invention to provide a self-leveling tray or ice dispenser wherein the lifting mechanisms are detachably connected without the use of tools for ready cleaning and inspection.

SUMMARY OF THE INVENTION

A self-leveling tray or ice dispenser includes a cavity and an opening within the cavity for storing ice or trays. The cavity includes a pair of opposed inner walls. The self-leveling of the ice or trays is accomplished by a pair of lifting mechanism. Each lifting mechanisms includes a shell which has a pair of longitudinal, opposed tracks which run the length of the shell and are parallel to each other. An upper hanger is juxtaposed between the opposed tracks near one end of the tracks. A series of holes are provided in the upper hanger to receive a first hook end of each extension spring.

A roller mechanism engages and travels the length of the opposed tracks of the shell. A cover is slidably removble from each shell and forms an enclosure for the spring or springs and the roller mechanism. Each lifting mechanism is removably attached to the cabinet. At least one protruding post or rivet extends inwardly into the cavity from the inner wall. Each post is adapted to be received in a keyhole slot provided in the shell.

The pair of lifting mechanisms, thus, hang from the opposed inner walls of the cavity. When the lifting mechanism is to be removed, it is urged upward so that the slot in the shell is separated from the post. The lifting mechanism is then moved inward toward the center of the cavity so that the inner wall is separated from the lifting mechanism. With the lifting mechanism removed from the cabinet, the cover can be slidably removed from the shell. The number of springs can, thus, be easily changed to adjust the amount of upward force to the ice or trays.

DETAILED DESCRIPTION OF THE PREFERRED EMBODIMENTS

Figure 1:
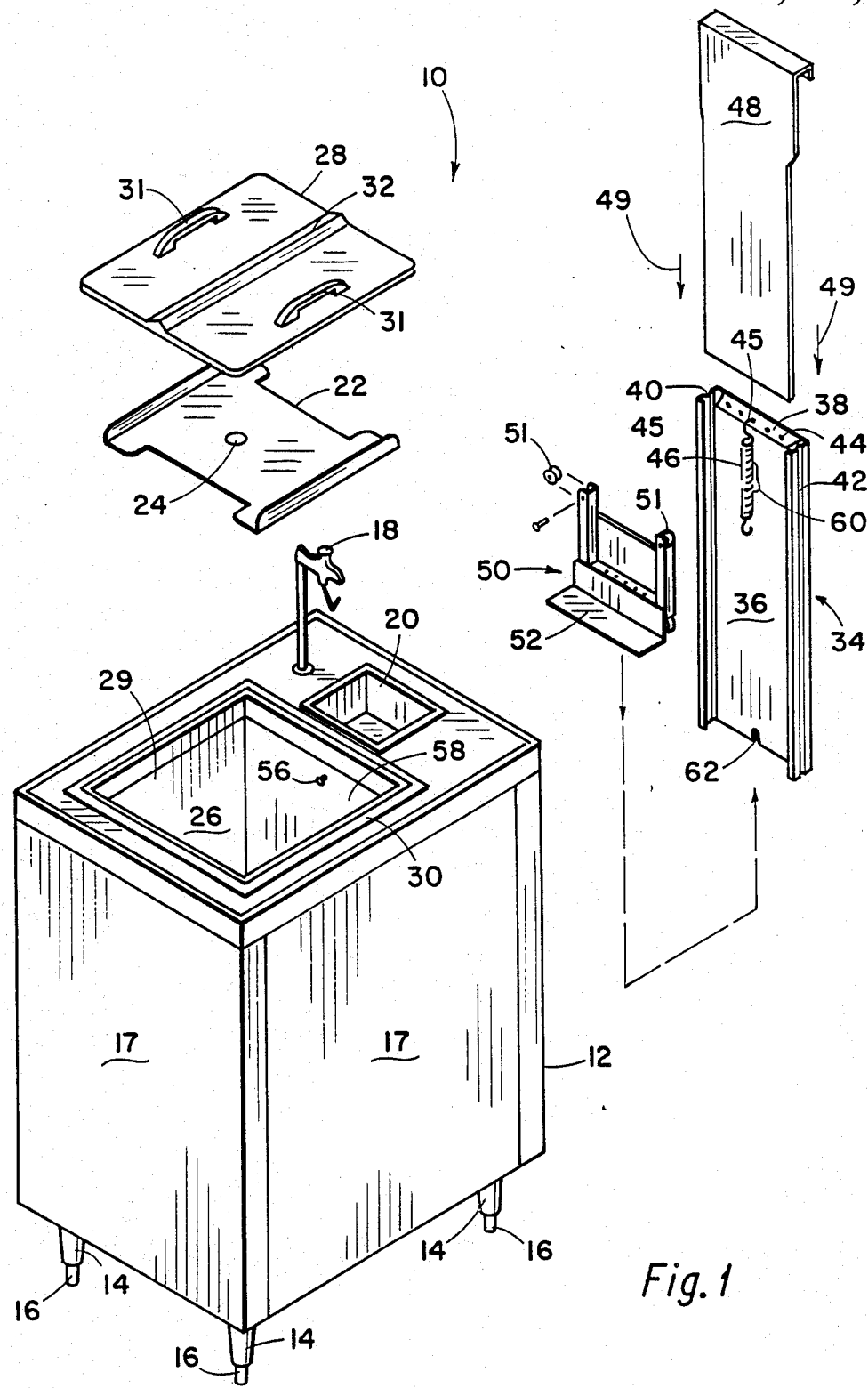
FIG. 1 shows an ice dispenser and a lifting mechanism in exploded form constructed in accordance with the present invention.

Referring to the drawings in detail, FIG. 1 shows an exploded view of a self-leveling ice dispenser 10 which is constructed in accordance with the present invention. As will be appreciated from the description herein, the present invention may also be utilized with tray dispensers or other equipment requiring self-leveling mechanisms, such as cup, glass, beverage or plate dispensers. The ice dispenser includes a cabinet 12 which may have legs 14 and casters 16 so that the dispenser is readily movable. The cabinet itself includes insulation (not shown) interior to the outer walls 17 to keep the ice cool. The outer walls may be constructed of stainless steel or other material which is sturdy and is easily cleaned.

The embodiment shown in FIG. 1 includes a water tower 18 which would be connected to a water supply (not shown) for a source of drinking water. Also included is a drain 20 recessed into the cabinet 12 adjacent the water tower. A bottom 22 is easily removable from the cavity by means of a finger hole 24: the bottom is designed to be received in a cavity 26 in the cabinet 12.

As can be readily appreciated, the ice (not shown) that is to be stored is placed within an opening 29 in the cavity 26 on top of the bottom 22. An optional insulated lid 28 closes the opening 29 in cavity 26 when the ice dispenser is not in use and seats in a raised edge throat liner 30. The lid 28 has a pair of handles 31. Additionally, the lid may be divided into two segments which are hingedly connected by a hinge 32 so that one segment of the lid can remain in place over the opening 29 in the cavity while the other segments allows access to the ice within the cavity. It should be understood that the foregoing description of the cabinet and the lid are fairly standard and well known.

A lifting mechanism 34 is seen in exploded form in FIG. 1 detached from the cabinet 12. The lifting mechanism is seen in partial cutaway in FIG. 2 in use with a tray dispenser. The lifting mechanism of the present invention is also seen in FIGS. 3 through 6.

Returning to a considersation of FIG. 1, the lifting mechanism 34 includes a shell 36 which has an upper hanger 38, and a pair of longitudinal opposed tracks 40 and 42. The hanger 38 is juxtaposed between opposed tracks 40 and 42 near one end of the tracks. The tracks 40 and 42 run the length of the shell 36 and are parallel to each other. The shell 36, upper hanger 38, and pair of tracks 40 and 42 may be formed from a single piece of material—in this case, stainless steel. A series of holes 44 are provided in the upper hanger 38 and are capable of receiving a first hook end 45 of each extension spring 46. While only a single spring is shown in FIG. 1, it should be understood that the number of springs may be varied depending on the load to be lifted. In the present embodiment, the number of springs may be varied between one and five. The amount of upward force is controlled by adding or subtracting springs.

A cover 48 is slidably removable from the shell 36 and forms an enclosure for the spring or springs 46. Arrows 49 show the direction of movement of the cover 48 to be slidably received in the shell 36.

A roller mechanism 50 engages and travels the opposed tracks of the shell 36. The roller mechanism includes a plurality of individual rollers 51. The roller mechanism allows a shelf 52 extending therefrom to travel the length of the opposed tracks 40 and 42. A series of holes 53 are provided in the roller mechanism 50 to receive a second hook end 54 or each spring.

The lifting mechanism 34 is removably attached to the cabinet 12. A protruding post or rivet 56 extends inwardly into the cavity 26 from an inner wall 58 within the cavity. The post 56 is adapted to be received in a keyhole slot 60 which is provided in the shell 36. A bottom protruding post (not shown) extending inwardly from inner wall 58 is received in a slot 62 in the shell 36. The lifting mechanism is, thus, simply connected and removed from the cabinet 12 without use of any tools. This arrangement allows for easy cleaning which is periodically required. The lifting mechanism 34 is easily removed from the cabinet. The cover 48 may then be separated from the shell by food service personnel and placed in a commercial dishwasher for cleaning.

As will be described herein, an additional lifting mechanism 34 (not shown) is identical and opposite to the lifting mechanism 34 shown in FIG. 1 and will be suspended from an inner wall (not shown in FIG. 1) opposite to inner wall 58. A pair of shelves 52 would, thus, be provided. The bottom 22 rests upon these shelves 52.

When the ice dispenser 10 is empty, the shelves 52 will be in the upper most position near the opening 29 in the cavity 26. When the bottom 22 is placed in the cavity resting on the shelves, ice may be loaded in the cabinet. As the ice is loaded in the cabinet, the downward force on the bottom and the shelves will increase. The springs 46 will stretch and the roller mechanism 50 will move downward away from opening 29.

Figure 2:
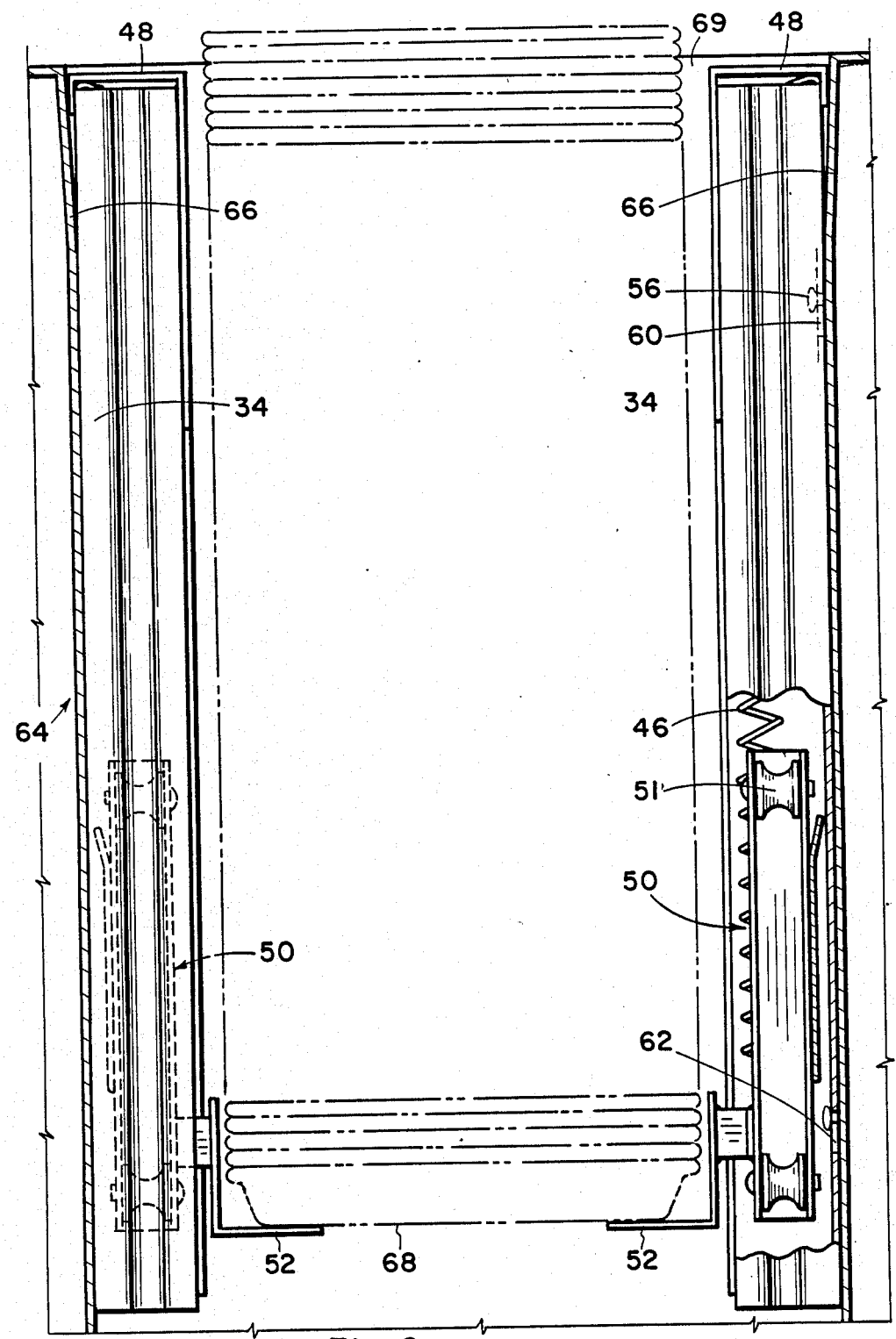
FIG. 2 shows a pair of lifting mechanisms as shown in FIG. 1 in use with a tray dispenser.

FIG. 2 discloses a tray dispenser 64 constructed in accordance with the present invention. The pair of lifting mechanisms 34 are suspended from opposed inner walls 66. The flat bottom 22 utilized in the ice dipenser in FIG. 1 is optional with a tray dispenser: trays 68 may rest directly upon the shelves 52. As the trays 68 are removed from the dispenser, the springs will urge the shelves 52 upward toward opening 69 of the tray dispenser 64 so that trays 68 will always be near the opening of the dispenser.

Figure 3:
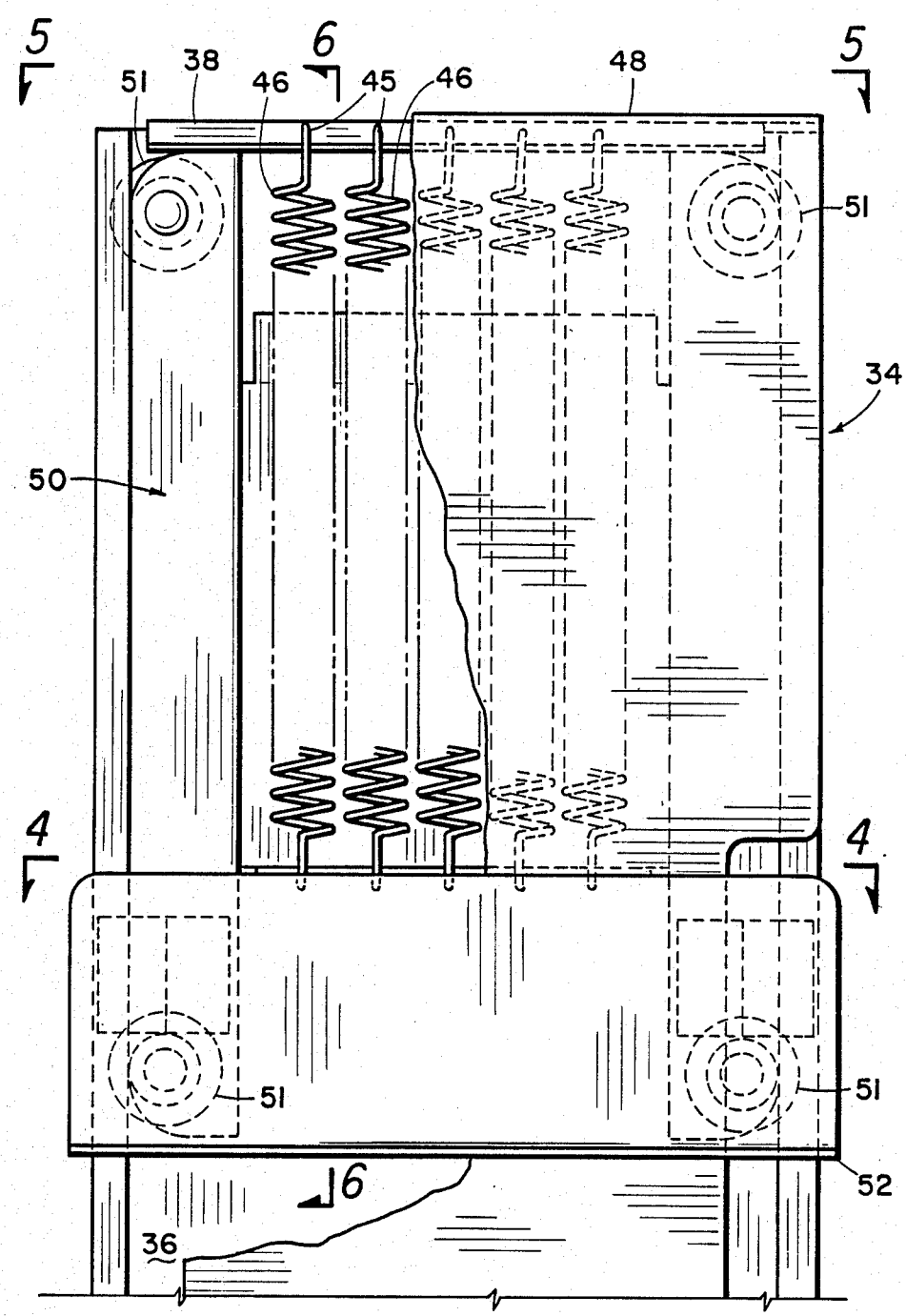
FIG. 3 shows a cut-away view of a lifting mechanism shown in FIG. 2 constructed in accordance with the present invention.

FIG. 3 shows a cutaway view of the lifting mechanism 34. In FIG. 3, there is no weight on the shelf 52 and the extension springs 46 are fully contracted. The roller mechanism 50 is positioned at the upper end of the shell 36 near the upper hanger 38. The lifting mechanism is shown apart from the inner wall of a tray dispenser 64. When the cover 48 is in place received in the shell, a pair of openings 70 are provided which allows the shelf 52 to travel in response to the movement of the roller mechanism.

Figure 4:
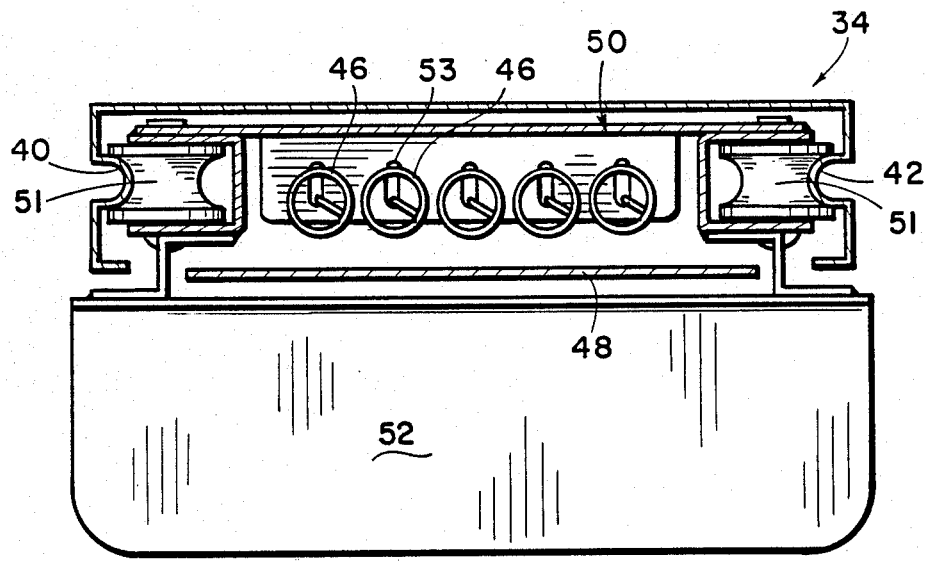
FIG. 4 is a sectional view of the lifting mechanism shown in FIG. 3 taken along section lines 4—4.

FIG. 4 shows a sectional view of the lifting mechanism 34. The springs 46 are juxtaposed between the rollers 51 of the roller mechanism 50 which move along tracks 40 and 42. The holes 53 in roller mechanism 50 to receive the second hook ends 54 of each spring are clearly seen.

Figure 5:
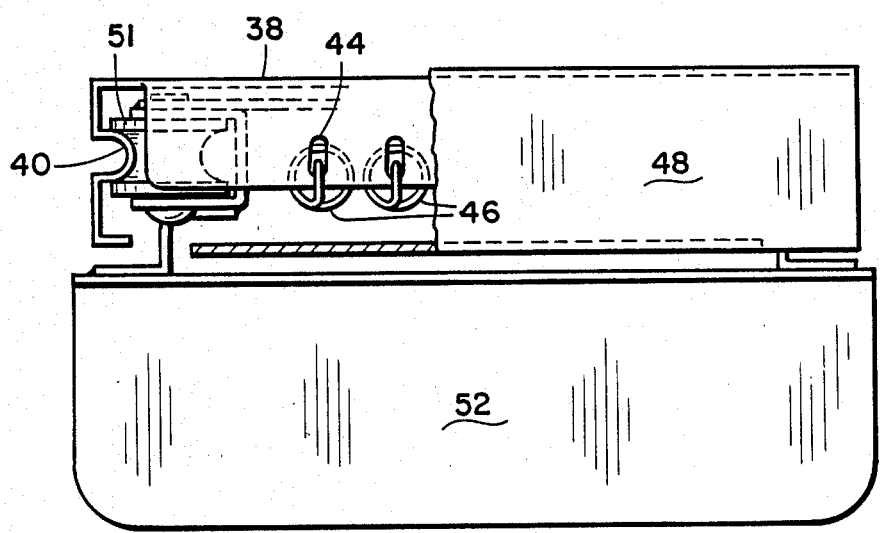
FIG. 5 is a partial cut-away view of the lifting mechanism shown in FIG. 3 taken along section lines 5—5.

FIG. 5 shows a partial cut-away of the lifting mechanism exposing the springs and roller mechanism.

Figure 6:
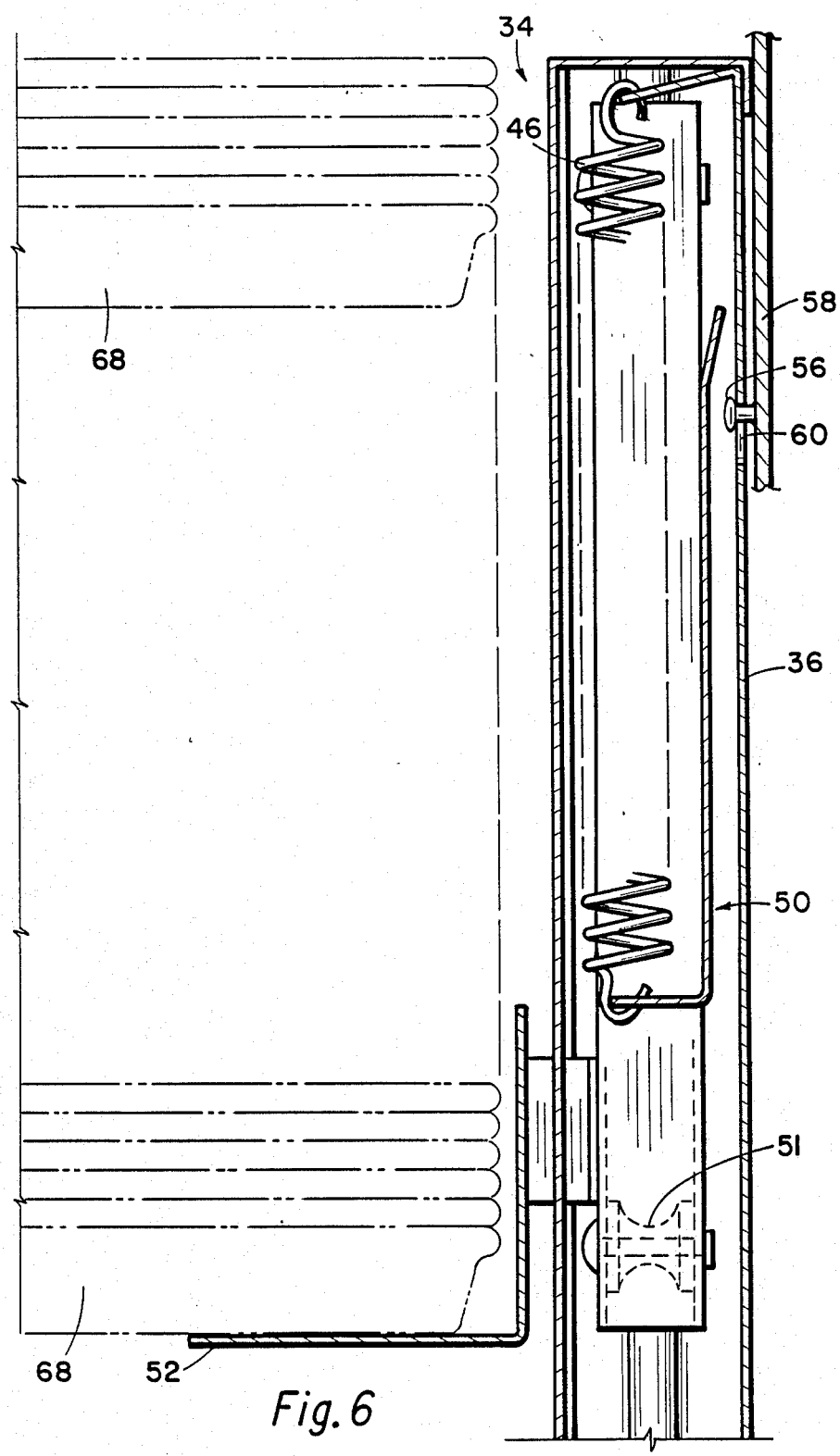
FIG. 6 is a sectional view of the lifting mechanism shown in FIG. 3 taken along section lines 6—6.

FIG. 6 shows a sectional view of the lifting mechanism 34 with a tray dispenser 64. When the lifting mechanism 34 is to be removed for cleaning, or for adjusting the upward force provided by the springs, the lifting mechanism is urged upward so that slot 62 is separated from the post and post 56 is aligned with the larger part of keyhole slot 60. The lifting mechanism is then moved inward toward the center of the cavity so that the inner wall is separated from the lifting mechanism. With the lifting mechanism removed from the cabinet, the cover 48 can be slidably removed from the shell 36. Once the cover 48 is removed, the springs 46 are exposed in the event the number of springs need to be varied.

To attach each of the lifting mechanisms to the cabinet, the reverse operation is performed.

Whereas, the present invention has been described in particular relation to the drawings attached hereto, it should be understood that other and further modifications, apart from those shown or suggested herein, may be made within the spirit and scope of this invention.

What is claimed is:

1. A self-leveling tray or ice dispenser which comprises: a pair of opposed inner walls within a cavity, each said wall having at least one post protruding inwardly into; a said pair of removable shells, each shell having a pair of opposed longitudinal tracks, an upper hanger near one end of said opposed tracks, and at least one slot through said shell; roller means engaging said opposed tracks on each said shell; a pair of shelves, one shelf extending into said cavity from each of said roller means, said shelves adapted to support ice or trays; at least one spring means extending between each said upper hanger and said roller means; and a pair of covers, one cover slidably removable from each said shell, whereby said shells may be detachably connected to said inner walls by mating said post with said slot and whereby said shells may be attached and removed from said inner walls without use of tools for periodic cleaning and inspection.

2. A self-leveling tray or ice dispenser as set forth in claim 1 including a flat, removable bottom adapted to rest on said shelves in order to support ice or trays.

3. A self-leveling tray or ice dispenser as set forth in claim 1 wherein the number of spring means may be varied in order to vary the amount of upward force.

4. A lifting mechanism for a self-leveling tray or ice dispenser having a pair of opposed inner walls in a cavity, each said inner wall having at least one post protruding inwardly into said cavity, which lifting mechanism comprises: a pair of removable shells, each shell having a pair of opposed longitudinal tracks, an upper hanger near one end of said opposed tracks, and at least one slot through said shell; roller means engaging said opposed tracks on each said shell; a pair of shelves, one shelf extending into said cavity from each said roller means, said shelves adapted to support ice or trays; a plurality of spring means extending between each said upper hanger and said roller means; and a pair of covers, one cover slidably removable from each said shell, whereby said lifting mechanism may be detachably connected to said inner walls by mating said post with said slot and whereby said lifting mechanism may be removed from said inner walls without use of tools for periodic cleaning and inspection.

5. A self-leveling tray or ice dispenser which comprises: a pair of opposed inner walls within a cavity, each said inner wall having at least one first connection means; a pair of removable shells, each shell having a pair of opposed longitudinal tracks, an upper hanger near one end of said opposed tracks, and at least one second connection means adapted to attach to said first connection means; roller means engaging said opposed tracks on each said shell; a pair of shelves, one shelf extending into said cavity from each of said roller means, said shelves adapted to support ice or trays; at least one spring means extending between each said upper hanger and said roller means; and a pair of covers, one cover slidably removable from each said shell, whereby said shells may be attached and removed from said inner walls without use of tools for periodic cleaning and inspection.

6. A self-leveling tray or ice dispenser as set forth in claim 5 wherein said roller means includes a plurality of rollers for engaging said opposed tracks and wherein said spring means is juxtaposed between said rollers.

7. A self-leveling tray or ice dispenser which comprises: at least one pair of opposed first connection means; a pair of removable shells, each shell having a pair of opposed longitudinal tracks, an upper hanger near one end of said opposed tracks, and at least one second connection means adapted to attach to said first connection means; roller means engaging said opposed tracks on each said shell; a pair of shelves, one shelf extending from each said roller means, said shelves adapted to support ice or trays; at least one spring means extending between each said upper hanger and said roller means; and a pair of covers, one cover slideably removable from each said shell, whereby said shells may be attached and removed from said first connections means without use of tools for periodic cleaning and inspection.

8. A self-leveling tray or ice dispenser as set forth in claim 7 wherein said roller means includes a plurality of rollers for engaging said opposed tracks and wherein said spring means is juxtaposed between said rollers.

9. A lifting mechanism for a self-leveling tray or ice dispenser having at least one pair of opposed first connection means, which lifting mechanism comprises: a pair of removable shells, each shell having a pair of opposed longitudinal tracks, an upper hanger near one end of said opposed tracks, and at least one second connection means adapted to attach to said first connection means; roller means engaging said opposed tracks on each said shell; a pair of shelves, one shelf extending from each said roller means, said shelves adapted to support ice or trays; a plurality of spring means extending between each said roller means; and a pair of covers, one cover slideably removable from each said shell, whereby said lifting mechanism may be attached and removed from said dispenser without the use of tools for periodic cleaning and inspection.

10. A lifting mechanism for a self-leveling tray or ice dispenser as set forth in claim 9 wherein said roller means includes a plurality of rollers for engaging said opposed tracks and wherein said spring means is juxtaposed between said rollers.

* * * * *